Figure 1:
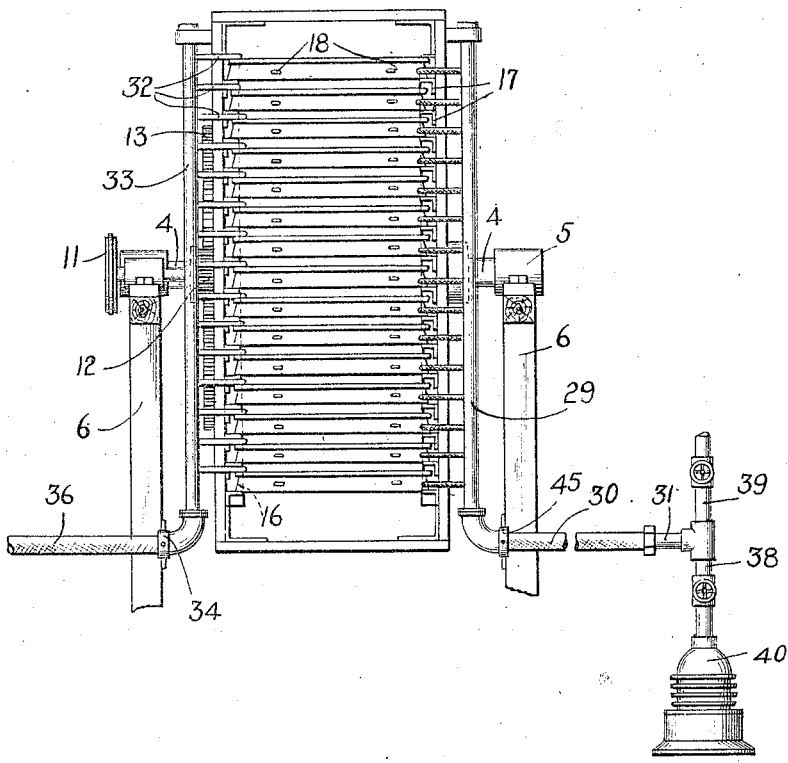

C. BUTTERS.
FILTER.
APPLICATION FILED OCT. 22, 1913.

1,165,068.

Patented Dec. 21, 1915.
3 SHEETS—SHEET 1.

WITNESSES
George Schlett
John O. Temple

INVENTOR,
Charles Butters,
BY Kenyon & Kenyon
his ATTORNEYS.

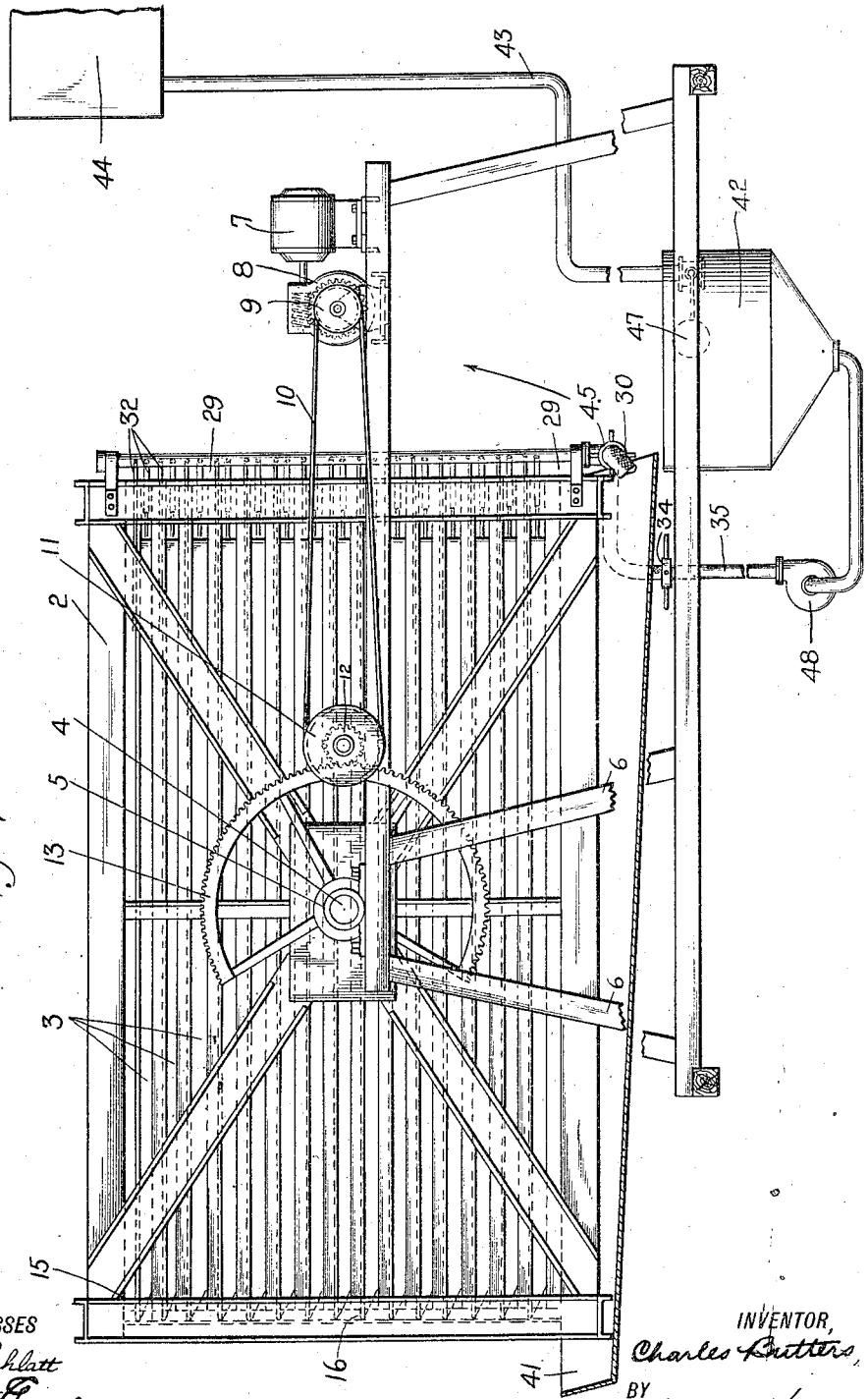

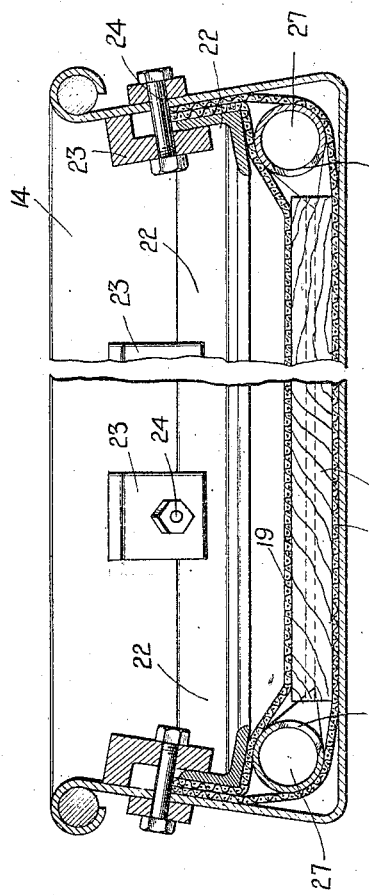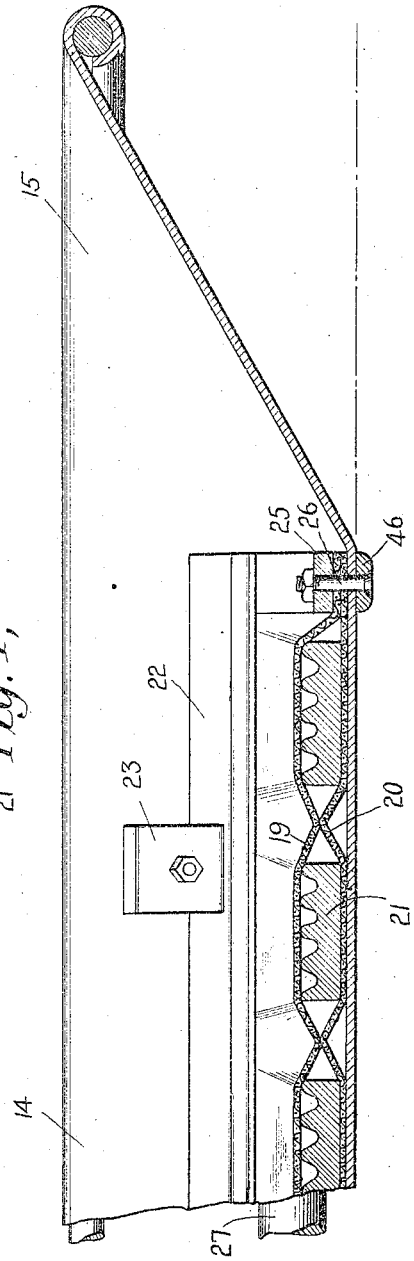

UNITED STATES PATENT OFFICE.

CHARLES BUTTERS, OF OAKLAND, CALIFORNIA.

FILTER.

1,165,068.             Specification of Letters Patent.      Patented Dec. 21, 1915.

Original application filed July 18, 1913, Serial No. 774,294. Divided and this application filed October 22, 1913. Serial No. 796,594.

*To all whom it may concern:*

Be it known that I, CHARLES BUTTERS, a citizen of the United States, and a resident of Oakland, county of Alameda, State of California, have invented certain new and useful Improvements in Filters, of which the following is a specification.

The invention relates to the filtration of liquids from liquids carrying solid and semi-solid material, and to a filter for performing the filtering operation.

The object of the invention is to provide an improved apparatus to be used in a process of separating fluid from solid and semi-solid material and of removing the solid and semi-solid material from the filter.

Another object of the invention is to provide a filter in which the filtering operation takes place in a substantially horizontal plane, and the discharge or removal of the solids and semi-solids takes place in a plane at an angle to the horizontal.

A further object of the invention is to provide an apparatus in which the filtered liquid may be withdrawn from a stream of material to be filtered.

The invention possesses many other objects and advantageous features which, with the foregoing, will be set forth at length in the following description where I shall outline in full that form of the invention which I have selected for illustration in the accompanying drawings. The novelty of the invention will be included in the claims succeeding said description. From this it will be apparent that I do not limit myself to the showing made by said drawings and description, as I may adopt many variations within the scope of my invention as expressed in said claims.

The present invention is adapted to metallurgical operations, particularly to the filtration of slimes in the cyanid process, although it may be employed in any instance where it is desirable to separate the solid or semi-solid material from its carrying liquid. In the filtering operation, the liquid is drawn or passed through a filtering medium, causing the solids and semi-solids to be deposited in the form of a cake on the filtering medium. According to my invention, I form the cake in a substantially horizontal plane and may do so from a flowing stream of slime or pulp, and I discharge the cake by tipping the filter to an inclined or vertical position. It is not essential that the filter be tipped or turned to an exactly vertical position, since in many instances the discharge of the cake may take place when the filter is at an angle to the vertical.

The cake is formed on the filter medium from a shallow bath of slime or pulp which may be a flowing stream, and such forming may be continuous until a cake of the desired thickness is obtained. After the cake has been formed, it may be treated with a shallow bath or with a flowing stream of barren solution, and of strong solution or otherwise, and it may be washed or impoverished by a shallow bath or by a flowing stream of wash water, after which it is sufficiently dried and discharged or removed.

The liquid to be filtered is drawn through the filtering medium by means of a vacuum or lowering of pressure on the side of the medium removed from the cake, and the process of filtering and further dissolving and impoverishing is continuous and is accomplished without intermitting the vacuum and without undue drying of the cake which might cause cracking of the cake.

In the accompanying drawings I have shown one form of apparatus for carrying out the method of my invention, but it is to be understood that the method is not limited to any particular form of apparatus. These drawings show a filter composed of a plurality of filter units arranged in superposed relation, but it is to be understood that one or any number of filter units may be employed and that the various units, in a multi-unit installation, may be arranged in any desired relation with respect to each other.

Figure 5:
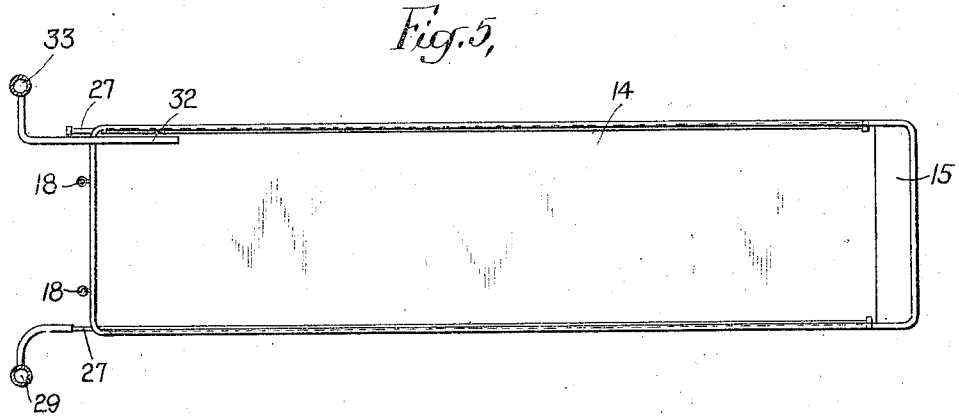

Referring to said drawings: Figure 1 is a rear end view of one form of filter. Fig. 2 is a side view of the filter shown in Fig. 1. Fig. 3 is a cross-section of one of the filter units, part thereof being broken away to reduce the size of the figure. Fig. 4 is a longitudinal section of the discharge end of one form of filter unit; and Fig. 5 is a plan view of a filter unit with the filter leaf removed.

The filter shown consists of a frame or support 2 of suitable design and construction in which the filter units 3 are arranged one above the other, the successive units being spaced apart sufficiently to allow the discharge of the cakes therefrom, as say three inches, and supported by any suitable means such as angle irons 17. The frame is provided with trunnions 4, engaging in bearings 5 arranged on the pedestals 6 so that the frame may be turned through an angle. The turning of the frame may be accomplished by any suitable means 7, such as a hand wheel or motor, through the medium of the worm gear 8 and the sprocket 9, chain 10, sprocket 11, pinion 12 and gear segment 13 secured to one of the trunnions 4. When the cake is being formed or treated, the filter units lie in a substantially horizontal plane and are thereafter tilted to an inclined or a vertical plane to discharge the cake.

The filter unit, of which there may be any desired number, as say forty, consists preferably of a metal pan 14 of the desired size and shape, as say 10 feet by 2½ feet, and which is preferably rectangular. All of the seams and joints in the pan are preferably welded to insure a fluid tight construction, and are as smooth and free from obstructions as possible, especially on the under side. The discharge end of the pan is provided with an overflow lip or side 15 which is preferably shaped, as shown, in order to facilitate the discharge of the cake when that end is depressed. The units are held from falling out of the frame when it is tilted by the angle pieces 16 which are placed along the inside front end of the frame. The units are placed in the frame from the rear and rest on the angle pieces 17. They have no tendency to fall out from the rear for the reason that the frame is never tilted in that direction. This allows ready removal of the units when the frame is tilted by inserting hooks or other suitable means in the eye bolts 18 fastened in the rear of the units.

Secured in the bottom of the pan is the filter leaf which is composed of two pieces 19—20 of canvas or other suitable material between which, at suitable intervals, are arranged the grooved or corrugated cross fillers 21. These fillers, besides holding the two pieces of canvas apart, serve also to help support the weight of the cake and liquid, and to prevent the bottom of the pan from sagging and bellying. These fillers extend transversely of the pan and are held in place by stitching the two pieces of canvas together between adjacent fillers. The sides and the rear end of the canvas are preferably clamped together and to the corresponding sides and end of the pan by means of the angles 22 and the clamps 23 and bolts 24. There are two of the angles 22. One extends from the front end to the middle of the rear end, and the other from that point around on the other side to the front end. They are, therefore, bent around the rear corners so as to hold the canvas all around on two sides and one end. The front end of the canvas is held by the member 25 and the bolts 26. The member 46 is placed under the pan to add strength to the front end. The heads of the bolts are countersunk so as to make as little roughening of the lower surface as possible. This construction obviates the necessity of punching or cutting holes in the canvas and renders the replacement of the canvas simple, should its removal be necessary or desirable. Arranged between the two pieces of the canvas and preferably lying adjacent the two sides of the pan are two pipes or conductors 27 provided with a plurality of perforations 28. These pipes 27 project from the pan at some suitable place so that one or both may readily be connected to a pipe or conductor 29, thereby placing the space between the pieces of canvas in communication with the conductor 29. It is desirable to occasionally wash out the inside of the leaf and for this purpose one of the pipes 27 may be opened to atmosphere at this time, and the other remain connected, as shown. When it is desired to wash out the leaf water is admitted through the pipes 39, 31, 30 and 29 and one of the pipes 27. This will flow through the leaf and be discharged through the other pipe 27. In order to prevent water from accumulating in the bottom of the pan below the filter leaf during cake discharge and washing out of the leaf, I prefer to coat the lower piece of canvas 20 with a waterproof material.

The slime or pulp to be filtered is fed onto the filter leaf, preferably at the rear corner, through the nozzles or conductors 32, which are preferably so arranged that the feeding stream is directed vigorously along one of the longer sides of the pan and below the surface of the bath. I have found that this arrangement produces an energetic movement of circulation of the shallow bath, and thereby a substantially uniform distribution of sands and slime and results in a substantially uniform cake. The nozzles or feed pipes 32 are preferably connected to a manifold pipe 33 which may be placed in communication with the supply of slime to be filtered. The pipe 33 is preferably mounted on one side of the tilting frame and is provided with a joint 34 so that it may be detached from the pipe 35 and be tilted with the frame. The pipe 33 is mounted to one side, as shown in Fig. 1, so that the units may be readily placed in the frame. This can be done because the feed pipes 32 normally go into the units over the top thereof, and, therefore, the units may be slid in place underneath the pipes 32 onto the angle supports.

The liquid to be filtered is drawn through the filtering medium 19 by a vacuum or partial vacuum produced thereunder, and is drawn off through one or both of the pipes 27 and the manifold pipe 29. The manifold pipe 29 is provided with a quick detachable coupling 45 connecting the pipe to a flexible conductor 30. The pipe 29 is attached to the tilting frame and before tilting may be detached from the flexible conductor. The flexible conductor 30 is connected to the conductor 31 to which are connected the valve controlled conductors 38—39 which are connected respectively to the vacuum pump 40 and to a source of air and water under pressure, not shown. In operation I prefer to feed the material to be filtered onto the leaves in excess of their filtering capacity, and this means that there will be an overflow at the end opposite the feed. It is desirable that this overflow be saved so I have provided a launder 41 which catches the overflow and conducts it to a tank 42. Connected with the upper end of this tank 42 is a pipe 43 leading to the main stock pulp tank 44. A float valve, or other suitable means 47, is arranged to regulate the amount of pulp in the tank 42. Connected to the tank 42 is a pump 48 which is adapted to force the pulp up the pipe 33 into the filtering units. It will be seen, therefore, that all the overflow is refed to the units and any further amount necessary to supply the units is automatically taken from the main stock. All the above apparatus makes it possible to handle very little more pulp than is necessary.

For the purposes of simplicity and clarity I shall describe the filtering operation as carried on in one filter unit, it being understood that the same operation takes place in all of the units of the filter. With the filter in a horizontal or a substantially horizontal position, the stream of slime or pulp is fed into the pan, and a vacuum or partial vacuum is produced below the filtering medium by placing the vacuum pump in communication with the conductor 29. The slime circulates over the entire surface of the filtering medium and forms a shallow bath above it and seals the vacuum. Thereupon the suction draws the solid particles downward upon the filtering medium and draws the liquid through the filtering medium. During the formation of the cake the frame may be tilted slightly to any desired angle to control the building up of the cakes, or the amount and character of the overflow of the bath, if any. The feed of the slime may be so regulated in proportion to the rate of withdrawal of the filtered liquid by the suction that the feed will be continuous, without discharging any of the bath over the discharge end of the pan. On the other hand, and preferably, the feed of the slimes may be in any desired excess of the rate at which the liquid is withdrawn by the suction so that there is an overflow from the discharge end of the pans. By this latter method a continuous stream of slimes may be fed into the pans and kept in vigorous circulation over the filtering medium or over the cake thereon, and clear liquor drawn by the suction through the cake and filtering medium and also a continuous stream of slimes discharged over the overflow lip of the pans until the thickness of the cake reaches the economical limit. The feed of slime is then stopped and the suction continued until nearly all the liquor of the bath is drawn through or into the cake and filtering medium. Thereupon without intermitting the suction barren solution is fed through pipes 32 into the pans and onto the filter cake until the pans are full and overflowing and the suction draws the barren solution through the cake and filter medium as long as desired, mechanically displacing the dissolved gold from the cake and chemically dissolving and displacing some of the undissolved gold. At the end the bath is sucked nearly dry as before.

Wash water in any quantity desired may then be fed through pipes 32 into the pans on top of the cakes without intermitting the suction the water being allowed to overflow and the cakes thereby impoverished of their contained solutions and dissolved values if any. After the feed of wash water is discontinued, the suction is maintained to draw through the last of the shallow bath of wash water and to dry the cake. When the cake is sufficiently dry, the suction is discontinued by closing the valve in conductor 38. The valve in conductor 39 is then opened, and water is admitted below the filtering medium through the pipe 27 for the purpose of wetting the medium, and thereby loosening the cake. The filter frame is then tilted until the filter pans are in an inclined or vertical position whereupon the cakes slide off into any suitable receptacle and are sluiced away or otherwise removed. I have found it desirable in some instances to blow air upwardly or outwardly through the filtering medium to assist the cake discharge and the cleansing of the filter medium, and this air may be introduced before tilting and continued thereafter for a short time, or it may be introduced after tilting, preferably the latter. Or the adhering particles of the cake may be loosened by forcing a mixture of air and water outwardly through the filtering medium or by any other means. The chief factor in the discharge of the cakes, however, is the tilting of the filtering media to a substantially vertical position, whereby the cakes are loosened from the media and sweep themselves off by their own accumulating weight. If desired the tilted pans with their filtering media may be hosed or sprayed for further cleansing. After the cake has been discharged the filter frame is returned to the horizontal, or substantially horizontal, position, and is in condition for another cycle of operations.

The matter claimed in this application is divided out of my application, Serial No. 774,294, filed July 18, 1913, in which the claims are directed to the process.

Having described my invention what I claim as new and desire to secure by Letters Patent is:—

1. A filter comprising an open frame, a plurality of superposed filter media in shallow pans carried by said frame and adapted to be tilted from a horizontal to an inclined position.

2. A filter comprising an open frame adapted to be tilted, a plurality of superposed filter media arranged on said frame, and means for tilting said frame.

3. A filter comprising a substantially horizontal filtering medium arranged in a shallow pan and adapted to be tilted, means for feeding excess of the material to be filtered onto said medium, and means for drawing a liquid portion thereof through said medium.

4. An open filter comprising a plurality of superposed filter media, means for tilting said media about a horizontal axis, means for simultaneously flowing a stream of slime onto each of said media, and means for simultaneously withdrawing a liquid portion thereof through each of said media.

5. A filter comprising an open frame mounted for rotation about a horizontal axis, a plurality of superposed shallow horizontal filter pans arranged on said frame, each of said pans being provided with an overflow lip at one end.

6. A filter comprising a plurality of superposed separate filter units, each unit comprising a shallow pan, a filter medium arranged near the bottom of each pan, means for feeding the material to be filtered onto said filter medium, means for supporting said medium free of the bottom of the pan, and means for drawing liquid through said medium.

7. A filter comprising a plurality of horizontally arranged superposed shallow pans, a filter medium arranged in each of said pans, a plurality of cross fillers in each pan below said filter medium, means for feeding the material to be filtered to each pan, and means for drawing liquid through said medium.

8. In a horizontal filter the combination of an open frame having a plurality of shallow filter elements therein, means for supplying material to be filtered to said elements whereby cakes are formed therein, and means for tilting said elements to discharge the cakes.

9. In a filter the combination of a plurality of substantially horizontal shallow filter elements, means for simultaneously supplying to said elements material to be filtered or drawn through, means for simultaneously carrying away the filtered liquid from said elements, means for carrying away the overflow from said elements, and means for tilting said elements.

10. In a filter plant a plurality of individual means for filtering, means for supplying material to be filtered from a tank to said filter means in excess of their filtering capacity and means for returning the excess to the tank whereby it may be again supplied to said filtering means.

11. A filter comprising an open tiltable frame, a plurality of shallow pans placed in said frame and having filtering means therein upon which a filter cake is adapted to be formed, each of said pans having a discharge lip at one end and a beveled under portion at the same end whereby when said frame is tilted to discharge the cake a ready passage for the cake will be found by reason of said beveled portions.

In testimony whereof, I have signed my name to this specification, in the presence of two subscribing witnesses.

CHARLES BUTTERS.

Witnesses:
NEWTON A. BURGESS,
EDWIN SEGER.